Oct. 3, 1961 D. E. WILSON 3,002,538

COMPONENT LEAD FORMING APPARATUS

Filed Oct. 21, 1957 2 Sheets-Sheet 1

INVENTOR
D. E. WILSON
BY R. P. Miller
ATTORNEY

Oct. 3, 1961 D. E. WILSON 3,002,538

COMPONENT LEAD FORMING APPARATUS

Filed Oct. 21, 1957 2 Sheets-Sheet 2

INVENTOR
D. E. WILSON
BY R. P. Miller
ATTORNEY

United States Patent Office 3,002,538
Patented Oct. 3, 1961

3,002,538
COMPONENT LEAD FORMING APPARATUS

Delbert E. Wilson, Winston-Salem, N.C., assignor to Western Electric Company, Incorporated, New York, N.Y., a corporation of New York Filed Oct. 21, 1957, Ser. No. 691,508
10 Claims. (Cl. 140—104)

This invention relates to wire forming apparatus, and more particularly to an apparatus for forming eyelets on the terminal extremities of twin-lead electrical components.

When attaching electrical components to screw-type terminals, it is customary to form the ends of the component leads into circular or substantially circular configurations. This operation is generally performed manually with the aid of a pair of long-nose pliers. Whenever the number of components involved is large, this manual operation is time-consuming and consequently expensive. It is manifest, of course, that an apparatus which could rapidly perform these operations would effect a considerable saving in time and money.

It is therefore a principal object of this invention to provide an apparatus which will simultaneously form eyelets on the terminal extremities of twin-lead electrical components.

It is another object of this invention to provide an apparatus which will cut component leads to length and rapidly form an eyelet on the extremity thereof.

It is a further object of this invention to provide an eyelet forming apparatus wherein the forming and cutting means are laterally adjustable to accommodate electrical components of varying lengths.

It is still another object of this invention to provide an apparatus which will form eyelets in the terminal extremities of electrical components and then eject the completed components from the apparatus.

It is yet another object of this invention to provide an eyelet forming tool having a helical camming surface for bending the extremity of a wire about a fixed cylindrical member to form an eyelet.

With these and other objects in view, the present invention contemplates a pair of apertured, cylindrical, forming tools having helical surfaces formed in the walls thereof and bending pins co-axial therewith. A drive means is provided for actuating cutters to trim the leads of electrical components to length and for moving the bending pins axially of the forming tools to cause the helical surfaces of the tools to bend the extremities of the component leads about the bending pins. Means are provided for withdrawing the bending pins from the completed eyelets and ejecting the completed components from the apparatus. The forming tools are slidably mounted on guide rods and are adjustable therealong to permit the accommodation of electrical components of varying lengths.

Other objects, advantages and novel features of the invention will become apparent upon consideration of the following detailed description in conjunction with the accompanying drawings wherein.

Figure 9:
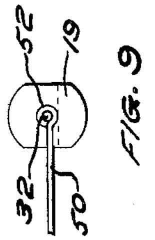
Figure 8:
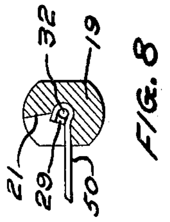
Figure 7:
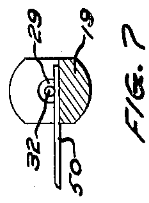
Figure 4:
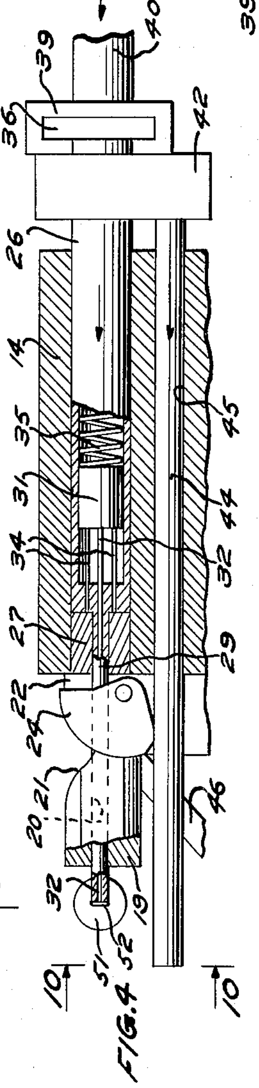
FIG. 4 is a view similar to FIG. 3 and illustrates the manner in which ejector rods withdraw the bending pin from the formed eyelet at the completion of the forming operation.
Figure 10:
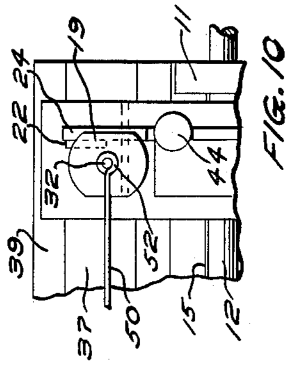
Figure 6:
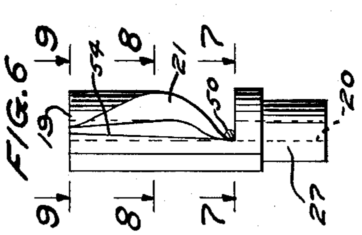
FIG. 6 is a view of the forming tool and illustrates a helical surface formed therein which bends the extremity of a component lead about the bending pin.

FIGS. 7, 8 and 9 are enlarged views taken along the lines 7—7, 8—8 and 9—9 of FIG. 6 illustrating several steps in the forming operation; and FIG. 10 is a fragmentary end elevation taken along the line 10—10 of FIG. 4 and illustrates one lead of a component having a completed eyelet formed on the extremity thereof at the instant the bending pin has been completely withdrawn from the eyelet and the component is completely ejected from the apparatus.

Figure 1:
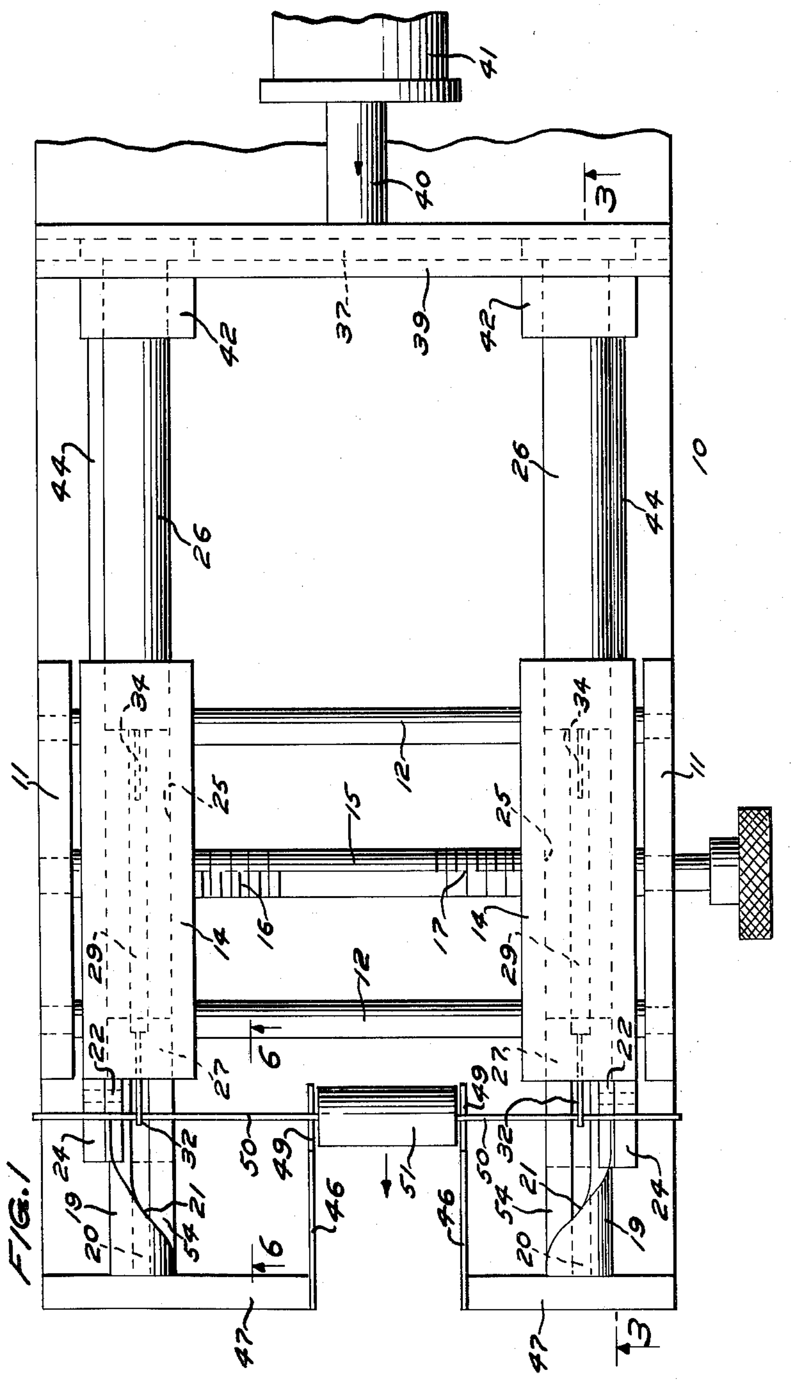
FIG. 1 is a top plan view of an apparatus embodying the principal features of the invention and illustrating the relative positions of the component parts prior to the initiation of an eyelet forming cycle.
Figure 3:
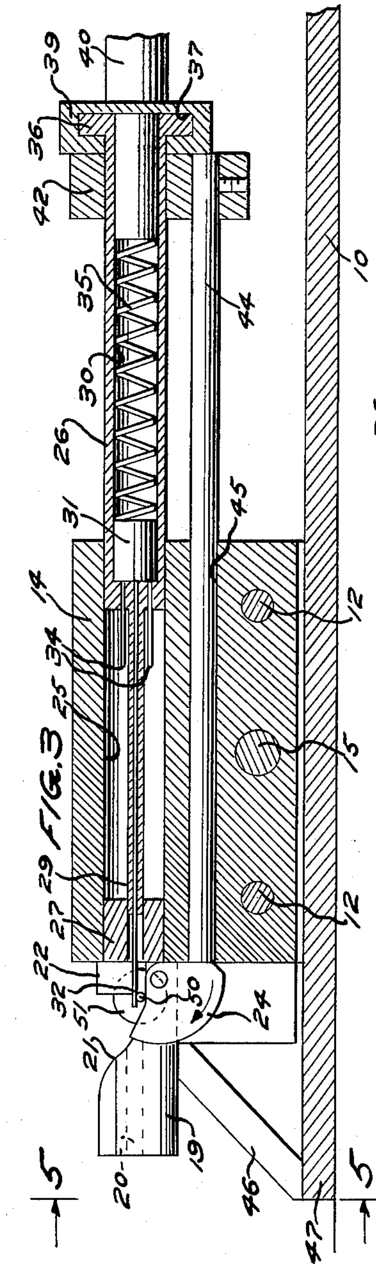
FIG. 3 is a sectional view taken along line 3—3 of FIG. 1 and illustrates the relative positions of cutters, a bending pin, and a component lead at the beginning of a forming operation.
Figure 5:
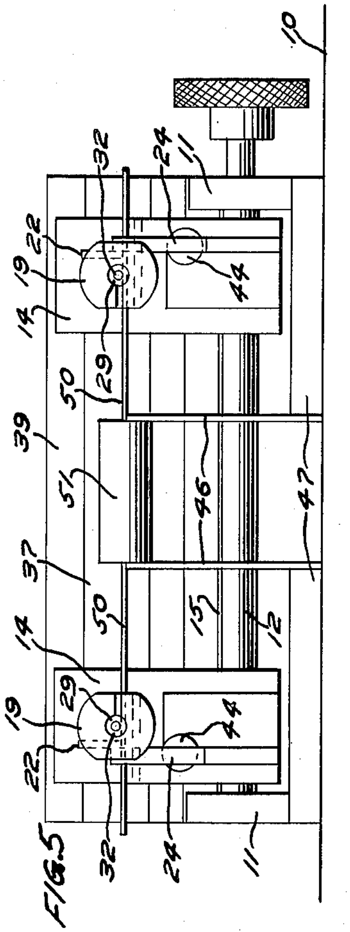
FIG. 5 is an end elevation taken along the line 5—5 of FIG. 3 and illustrates the manner in which an electrical component and the leads thereof are supported relative to the forming tools and cutters prior to the actuation of the apparatus.

Attention now is directed to the drawings wherein like numerals of reference designate like parts throughout the several views, and in particular to FIGS. 1, 3 and 5 wherein is disclosed a base 10 having vertical side plates 11 fixed thereto. A pair of guide rods 12 interconnect the plates 11 and support tool carriers 14 slidably thereon. An adjusting screw 15 interconnects the carriers 14 and is provided with threaded portions 16 and 17 of opposite hand to permit adjustment of the carriers 14 relative to each other and along the rods 12 upon rotation of the screw 15.

Each carrier 14 mounts a forming tool 19 (FIG. 6) which is provided with an axial aperture 20 and a helical forming surface 21. Each carrier 14 also mounts a fixed cutting blade 22 with a movable cutting blade 24 pivoted thereon. The carriers 14 are provided with longitudinal apertures 25 which slidably receive elongated bending pin supports 26. A bushing 27 is fixed within each aperture 25 to slidably support reduced portions 29 of the members 26.

Enlarged portions of the support members 26 are provided with longitudinal apertures 30 within which are positioned pistons 31. Each piston 31 has fixed thereto a bending pin 32 which projects through an axial aperture in the reduced portion 29 and therebeyond. Each piston 31 is also provided with ejector pins 34 which are adapted to engage bushings 27 to retract the bending pins 32 into the apertures in the reduced portions 29. A compression spring 35 is provided within each aperture 30 to normally urge the pistons 31 to the left, as viewed in FIG. 3.

The rearward extremities 36 of the members 26 are T-shaped in cross-section and are slidable within a T-shaped groove 37 formed in a cross-member 39. The member 39 is rigidly connected to an actuating rod 40 of an air cylinder or similar power source 41. The air cylinder 41, or the like, is provided to effect reciprocation of cross-member 39 and the support members 26 (laterally in FIGS. 1 and 3). The members 26 are provided with supporting blocks 42 adjacent the cross-member 39. The blocks 42 support cutter actuating rods 44 which are slidable within apertures 45 formed in the carriers 14.

A pair of angular component supports 46 are secured to extensions 47 of the base 10 and are positioned intermediate the sides thereof. The supports 46 or extensions 47 may be made laterally adjustable to provide for forming eyelets in leads of components having leads of unequal lengths. The supports 46 are provided with horizontal top surfaces 49 upon which the leads 50 of a component 51 rest prior to the initiation of a forming cycle.

*Operation*

In order that a better understanding of the invention may be had, its mode of operation during a typical forming cycle will now be described. A component 51 (FIG. 1) is placed in the apparatus with the leads 50 thereof resting upon the upper surfaces 49 of the component supports 46. The component is so positioned that the outer portions of the leads 50 are abutted against the fixed cutter blades 22 and lie beneath the extremities of the bending pins 32 which project beyond the carriers 14. With the component 51 in position, the air cylinder 41 is next actuated to begin moving cross-member 39 and the support members 26 to the left, as viewed in FIG. 1.

As the members 26 begin to move to the left, the actuating rods 44 cause the movable cutter blades 24 (FIG. 4) to pivot in a direction indicated by the arrow in FIG. 3 and thus cut away the excess portions of the leads 50 which project beyond the outer surfaces of the fixed cutting blades 22. During this portion of the movement, the component 51 has remained motionless because the bending pins 32 are sliding over the tops of the leads 50. As the cutting operation is completed, the extremities of the reduced portions 29 engage the leads 50 and begin moving the component 51 to the left, as viewed in FIGS. 1 and 3. As the support members 26 continue to move to the left, the reduced portions 29 enter and slide through the apertures 20 formed in the tools 19. The extremities of the leads 50, however, engage the helical surfaces 21 of the tools 19. Since the leads 50 are being forced to move by engagement with the extremities of the reduced portions 29, the extremities of the leads will be bent about the bending pins 32 due to contact with the forming surfaces 21. This is clearly illustrated in FIGS. 8 and 9 which show the shape of the lead 50 at the intermediate and end points of the forming operation.

Figure 2:
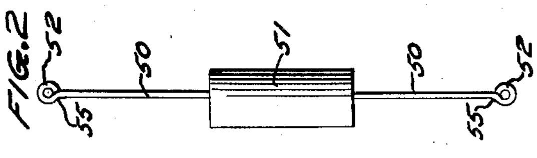
FIG. 2 is a view of an electrical component having eyelets formed in the extremities of the leads thereof by the use of the apparatus embodied in the present invention.

When the leads 50 have been forced completely through the forming tools 19, they will have been formed into eyelets 52, as best illustrated in FIG. 2. The forming tools 19 are provided with surfaces 54 which lie in planes slightly offset from the longitudinal axes of the tools 19. The surfaces 54 form reverse bends 55 (FIG. 2) at the same time that the surfaces 21 are forming the remaining portions of the eyelets 52. The reverse bends 55 thus position the centers of the eyelets 52 along the axes of the leads 50 rather than offset therefrom.

As the formed eyelets clear the tools 19, the ejector pins 34 simultaneously engage the bushings 27. Continued movement of the reduced portions 29 of members 26 then slide the eyelets 52 along the bending pins 32 since the bending pins are precluded from further movement by the ejector pins 34 contacting the bushings 27. The members 26 continue to move until the enlarged portions thereof also engage bushings 27. The ejector pins 34 are of such length that at this point the eyelets 52 have been pushed completely off bending pins 32 (FIG. 10) and the completed components 51 are thus free to fall into a chute or container.

Thus it can be seen that an apparatus has been provided which will rapidly trim the leads of electrical components to length and form eyelets in the extremities thereof and then eject the completed components from the apparatus. It can further be seen that an apparatus has been provided for performing the above operations on electrical components of varying sizes and having varying lengths of leads thereon.

It is to be understood that the above-described arrangements of apparatus and construction of elemental parts are simply illustrative of an application of the principles of this invention. Numerous other arrangements and modifications may be readily devised by those skilled in the art without departing from the invention.

What is claimed is:

1. An apparatus for trimming and forming an extremity of a wire with an eyelet comprising, a forming tool defining a generally cylindrical passage therethrough having a longitudinal central axis, cutter means spaced a predetermined distance from the longitudinal central axis of the forming tool passage for cutting the wire to proper length, said forming tool also defining an open ended slot extending generally axially of and opening radially into the forming tool passage, one wall of the slot extending substantially axially of the passage and the other forming a helix of approximately 180° about the passage, a nonrotatable slidable support, means on said slidable support movable therewith for actuating said cutter means, said slidable support further including a cylindrical head slidable freely and with small clearance within the passage, a bending pin slidably received within a central axial aperture in said head and having a normal position with respect thereto wherein it projects beyond one end of said head, said bending pin being of such diameter as to be freely receivable with small clearance within the passage with a turn of the wire wrapped thereabout, said slidable support also including stop means preventing movement of said pin outwardly beyond said normal position, spring means urging said pin outwardly to said normal position with respect to said head, and means limiting axial movement of said pin with respect to said forming tool, said head being engageable with the extremity of the wire when the wire is positioned in the forming tool slot to move the wire through the forming tool passage whereby said walls of said forming tool engage and bend the wire about said pin, said head being further movable against the action of said spring means after said limiting means interrupt movement of said pin whereby the eyelet formed in said wire may be stripped from said pin.

2. An apparatus for trimming and forming an extremity of a wire with an eyelet comprising, a forming tool defining a generally cylindrical passage therein having a longitudinal central axis, cutter means spaced a predetermined distance from the longitudinal central axis of the forming tool passage for cutting the wire to proper length, said forming tool also defining an open ended slot extending generally axially of and opening radially into the forming tool passage, one wall of the slot extending substantially axially of the passage and the other forming a helix of approximately 180° about the passage, a movable support, means on said movable support movable therewith for actuating said cutter means, said movable support including a cylindrical head slidable freely and with small clearance within the passage, a bending pin mounted on one end of said head centrally thereof and in substantially axial alignment with the forming tool passage, said bending pin being of such diameter as to be freely receivable within said passage with a turn of the wire wrapped thereabout, said head being engageable with the extremity of the wire when the wire is positioned in the forming tool slot to move the wire through the forming tool passage whereby said walls of said forming tool engage and bend the wire about said pin.

3. An apparatus for forming eyelets in the terminal extremities of twin-lead electrical components comprising, a pair of forming tools for receiving respective leads of the electrical component, each forming tool defining a generally cylindrical passage therein, each forming tool also defining an open ended slot extending generally axially of and opening radially into the forming tool passage, one wall of each slot extending substantially axially of the associated passage and the other forming a helix of approximately 180° about the associated passage, rigid movable support means, said support means including a pair of cylindrical heads each axially aligned with a respective forming tool passage and each slidable freely and with small clearance within its passage, a bending pin mounted on one end of each head centrally thereof, each of said bending pins being of such a diameter as to be freely receivable with small clearance within its associated passage with a turn of a lead wrapped thereabout, said heads each being engageable with a respective lead when the lead is positioned in its associated forming tool slot to move the leads through the forming tool passages whereby said walls of said forming tools bend the leads about said pins.

4. In an apparatus for forming an eyelet in a wire, including a forming tool provided with a generally cylindrical passage therethrough and an open ended slot extending generally axially and opening radially into the forming tool passage, one wall of said slot extending substantially axially of said cylindrical passage and the other forming a helix of approximately 180° about said passage, the improvement comprising, a slidable support, said slidable support including a cylindrical head slidable freely and with small clearance within said passage, a bending pin slidably received within a central axial aperture in said head and having a normal position with respect thereto wherein it projects beyond one end of said head, said bending pin being of such diameter as to be freely receivable with small clearance within the passage with a turn of the wire wrapped thereabout, said slidable support also including stop means preventing movement of said pin outwardly beyond said normal position, spring means urging said pin outwardly to said normal position with respect to said head, and means limiting axial movement of said pin with respect to the forming tool, said head being engageable with the extremity of the wire when the wire is positioned in the forming tool slot to move the wire through the forming tool passage whereby the walls of the forming tool engage and bend the wire about said pin, said head being further movable against the action of said spring means after said limiting means interrupt movement of said pin, whereby the eyelet formed in said wire may be stripped from said pin.

5. An apparatus for trimming and forming an extremity of a wire with an eyelet comprising, a forming tool defining a generally cylindrical passage therethrough having a longitudinal central axis, cutter means, including a pivoted cutter member, spaced a predetermined distance from the longitudinal central axis of the forming tool passage for cutting the wire to proper length, said forming tool also defining an open ended slot extending generally axially of and opening radially into the forming tool passage, one wall of the slot extending substantially axially of the passage and the other forming a helix of approximately 180° about the passage, a movable support, means on said movable support movable therewith for actuating said pivoted cutter member, said movable support including a cylindrical head slidable freely and with small clearance within the passage, a bending pin mounted on one end of said head centrally thereof and in substantially axial alignment with the forming tool passage, said bending pin being of such diameter as to be freely receivable within the passage with a turn of the wire wrapped thereabout, said head being engageable with the extremity of the wire when the wire is positioned in the forming tool slot to move the wire through the forming tool passage whereby said walls of said forming tool bend the wire about said pin.

6. An apparatus for forming eyelets in the terminal extremities of twin-lead electrical components comprising, a pair of forming tools for receiving respective leads of the electrical component, each forming tool defining a generally cylindrical passage therethrough having a longitudinal central axis, separate cutter means each spaced a predetermined distance from the longitudinal central axis of a respective forming tool passage for cutting a lead to proper length, each forming tool also defining an open ended slot extending generally axially of and opening radially into the forming tool passage, one wall of each slot extending substantially axially of the passage and the other forming a helix of approximately 180° about the passage, movable support means, means on said support means movable therewith for actuating said cutter means, said support means including a pair of cylindrical heads each axially aligned with a respective forming tool passage and each slidable freely with small clearance within its passage, a bending pin mounted on one end of each head centrally thereof, each of said bending pins being of such a diameter as to be freely receivable with small clearance within its associated passage with a turn of a lead wrapped thereabout, said heads each being engageable with a respective lead when the lead is positioned in its respective forming tool slot to move the leads through the forming tool passages whereby said walls of said forming tools bend the leads about said pins.

7. An apparatus for forming eyelets in the terminal extremities of twin-lead electrical components comprising, a pair of forming tools for receiving respective leads of the electrical component, each forming tool defining a generally cylindrical passage therethrough, each forming tool also defining an open ended slot extending generally axially of and opening radially into the forming tool passage, one wall of each slot extending substantially axially of the passage and the other forming a helix of approximately 180° about the passage, rigid movable support means, said support means including a pair of cylindrical heads each axially aligned with a respective forming tool passage and each slidable freely and with small clearance within its passage, a bending pin slidably received within a central axial aperture in each head and having a normal position with respect thereto wherein it projects beyond one end of said head, each of said bending pins being of such diameter as to be freely receivable with small clearance within its associated passage with a turn of a lead wrapped thereabout, said heads each being engageable with a respective lead when the lead is positioned in its respective forming tool slot to move the leads thorugh the forming tool passages whereby said walls of said forming tools engage and bend the leads about said pins, said slidable support also including stop means preventing movement of said pins outwardly beyond their normal positions, spring means urging each pin outwardly to its normal position with respect to its associated head, and means limiting axial movement of said pins with respect to said forming tools, said heads being further movable against the action of said spring means after said limiting means interrupt movement of said pins, whereby the formed component leads may be stripped from said pins.

8. An apparatus for forming eyelets in the terminal extremities of twin-lead electrical components comprising, a base, a pair of forming tools mounted on the base for receiving respective leads of the electrical component, each forming tool defining a generally cylindrical passage therethrough having a longitudinal central axis, separate cutter means on said base each spaced a predetermined distance from the longitudinal central axis of a respective forming tool passage for cutting a lead to proper length, each forming tool also defining an open ended slot extending generally axially of and opening radially into the forming tool passage, one wall of each slot extending substantially axially of the passage and the other forming a helix of approximately 180° about the passage, rigid movable support means on said base, means on said support means movable therewith for actuating said cutter means, said support means including a pair of cylindrical heads each axially aligned with a respective forming tool passage and each slidable freely and with small clearance within its passage, a bending pin slidably received within a central axial aperture in each head and having a normal position with respect thereto wherein it projects beyond one end of said head, each of said bending pins being of such diameter as to be freely receivable with small clearance within its associated passage with a turn of a lead wrapped thereabout, said slidable support also including stop means preventing movement of said pins outwardly beyond their normal positions, spring means urging each pin outwardly to its normal position with respect to its associated head, and means limiting axial movement of said pins with respect to said forming tools, said heads being further movable against the action of said spring means after said limiting means interrupt movement of said pins, whereby the formed component leads may be stripped from said pins.

9. Apparatus for forming an eyelet at one end of a wire comprising a forming tool defining a generally cylindrical passage therethrough, and plunger means extendable axially into and through said cylindrical passage, said forming tool also defining an open ended slot extending generally axially of and opening radially into said cylindrical passage, one wall of said slot extending substantially axially of said cylindrical passage and the other forming a helix of approximately 180° about said passage, said plunger means including a cylindrical head slidable freely and with small clearance within said passage and a pin of such diameter as to be freely receivable with small clearance within said passage with a turn of such wire wrapped thereabout, said pin being slidably received within a central axial aperture in said cylindrical head and having a normal position with respect thereto wherein it projects beyond one end of said head, said plunger means also including stop means preventing movement of said pin outwardly of said head beyond said normal position, spring means urging said pin outwardly to said normal position with respect to said head, and means limiting axial movement of said pin with respect to said forming tool, said head being engageable with the end portion of such a wire extending into said slot to bend said wire about said pin to form an eyelet as said head advances through said passage and forces said wire along said walls of said forming tool, said head being further movable against the action of said spring means after said limiting means interrupt movement of said pin, whereby said eyelet formed in said wire may be stripped from said pin.

10. Apparatus for forming an eyelet at one end of a wire comprising a forming tool defining a generally cylindrical passage therethrough having a longitudinal central axis, and plunger means extendable axially into and through said cylindrical passage, cutter means, including a pivoted cutting member, spaced a predetermined distance from the longitudinal central axis of the forming tool passage for cutting the wire to proper length, means on said plunger means for actuating said pivoted cutting member, said forming tool also defining an open ended slot extending generally axially of and opening radially into said cylindrical passage, one wall of said slot extending substantially axially of said cylindrical passage and the other forming a helix of approximately 180° about said passage, said plunger means including a cylindrical head slidable freely and with small clearance within said passage and a pin of such diameter as to be freely receivable with small clearance within said passage with a turn of such wire wrapped thereabout, said pin being slidably received within a central axial aperture in said cylindrical head and having a normal position with respect thereto wherein it projects beyond one end of said head, said plunger means also including stop means preventing movement of said pin outwardly of said head beyond said normal position, spring means urging said pin outwardly to said normal position with respect to said head, and means limiting axial movement of said pin with respect to said forming tool, said head being engageable with the end portion of such a wire extending into said slot to bend said wire about said pin to form an eyelet as said head advances through said passage and forces said wire along said walls of said forming tool, said head being further movable against the action of said spring means after said limiting means interrupt movement of said pin, whereby said eyelet formed in said wire may be stripped from said pin.

References Cited in the file of this patent

UNITED STATES PATENTS

| | | |
|---|---|---|
| 812,779 | Ackley | Feb. 13, 1906 |
| 1,526,716 | Neunberg | Feb. 17, 1925 |
| 2,450,920 | Shand | Oct. 12, 1948 |
| 2,713,878 | Stahl | July 26, 1955 |
| 2,737,211 | Perry | Mar. 6, 1956 |
| 2,777,477 | Zimmerman | Jan. 15, 1957 |